United States Patent [19]

Takatsuki

[11] 4,310,104
[45] Jan. 12, 1982

[54] VACUUM BOTTLE WITH BELLOWS PUMP

[75] Inventor: Toyohiko Takatsuki, Izumi, Japan

[73] Assignee: Zojirushi Vacuum Bottle Co., Ltd., Osaka, Japan

[21] Appl. No.: 183,738

[22] Filed: Sep. 3, 1980

[30] Foreign Application Priority Data

Sep. 4, 1979 [JP] Japan ............................ 54-122797
Sep. 26, 1979 [JP] Japan ............................ 54-133764

[51] Int. Cl.³ .................... F04B 43/02; B67D 5/54; A47J 41/02
[52] U.S. Cl. .................................. 222/131; 222/209; 222/401
[58] Field of Search .............. 222/131, 209, 380, 383, 222/400.5, 400.8, 401

[56] References Cited

U.S. PATENT DOCUMENTS

| | | | |
|---|---|---|---|
| 2,920,795 | 1/1960 | Piker | 222/131 |
| 3,278,088 | 10/1966 | Christman et al. | 222/131 X |
| 3,905,520 | 9/1975 | Nishioka | 222/209 |
| 4,113,147 | 9/1978 | Frazier et al. | 222/131 |
| 4,116,366 | 9/1978 | Takenakashima et al. | 222/131 |
| 4,174,053 | 11/1979 | Shimizu | 222/383 X |
| 4,238,054 | 12/1980 | Chen | 222/131 |

FOREIGN PATENT DOCUMENTS

568748  11/1975  Switzerland .......................... 222/209

*Primary Examiner*—David A. Scherbel
*Attorney, Agent, or Firm*—Stevens, Davis, Miller & Mosher

[57] ABSTRACT

There is disclosed a vacuum bottle with a bellows pump adapted to feed air into the interior of the inner bottle to increase the internal pressure therein, thereby pouring the liquid in the inner bottle therefrom through the pumping tube and pouring tube.

The bellows pump comprises a bellows body integrally molded with a bottom having an air outlet, a return spring arranged in the bellows body, a bellows cap movably mounted in an air inlet formed at the central portion of an upper plate of the bellows body, and an externally threaded cylindrical fixing member having an upper flange and being provided with an air tube at its bottom, the fixing member being inserted in the air outlet of the bellows body and screwed in an internally threaded bore provided in the bottom of the lid body so as to place an internal edge of the bottom of the bellows body forming the air outlet between the upper flange of the fixing member and the bottom of the lid body, thereby incorporating the bellows pump as an integral part of the lid body, the return spring being placed between said bellows cap and the fixing member. The vacuum bottle of the above construction is easy in assembly operation and excellent in durability.

4 Claims, 13 Drawing Figures

VACUUM BOTTLE WITH BELLOWS PUMP

BACKGROUND OF THE INVENTION

This invention relates to vacuum bottles with a bellows pump, so called "Air Pots". More particularly it relates to an improvement in a vacuum bottle with a manually operated bellows pump which serves to pump air into an interior of an inner bottle to increase the internal pressure in the inner bottle, thereby pouring the liquid in the inner bottle therefrom through a pumping tube and a pouring tube without lifting the vacuum bottle.

In the conventional vacuum bottles of the kind mentioned above, there has generally been employed a bellows pump comprising a bellows body, upper and lower plates formed separately from the bellows body and fused to the openings of the bellows body, and a return spring placed between the upper and lower plates to keep the bellows body expanded. Although such a bellows pump has a simple construction, it is difficult to join the bellows body to the upper and lower plates by fusing because the bellows body is molded with polyethylene which possesses good extensibility but poor fusing characteristics. Thus, it takes a great deal of skilled labor forces in its assembly operation. In order to overcome such a problem, it has been proposed to use an integrally molded bellows pump of which the upper and lower plates are molded as integral parts of the bellows body with polyethylene. In such a bellows pump, the lower plate is provided, at its central portion as an integral part therof, with a downwardly projecting small air tube which is screwed or pressed into an opening provided in the bottom of a lid body. Because of the poor creep characteristics and softening of polyethylene, however, there is a fear of air leakage resulting from the decrease of the fitting force between the bellows pump and the lid body during long service. In addition, it is troublesome to introduse the return spring into the bellows pump since the spring must be inserted through the small air tube or air inlet.

SUMMARY OF THE INVENTION

It is therefore an object of the present invention to provide a vacuum bottle with a bellows pump which is easy in assembly operation and excellent in the durability.

According to the present invention, there is provided a vacuum bottle with a bellows pump comprising an inner bottle of a vacuum-insulated double wall construction, an outer container comprising a cylindrical body provided with a bottom, a shoulder body mounted on the top of the cylindrical body and provided with a liquid supply line to which a downwardly extending pumping tube and a pouring tube are connected, a lid body removably mounted on the shoulder body, and a bellows pump arranged in the lid body and adapted to feed air into the interior of the inner bottle to increase the internal pressure therein, thereby pouring the liquid in the inner bottle therefrom through the pumping tube and the pouring tube; said inner bottle being arranged in a space formed between said body and the shoulder body, said bellows pump comprising a bellows body integrally molded with a bottom having an air outlet, a return spring arranged in the bellows body, a bellows cap movably mounted in an air inlet formed at the central portion of an upper plate of the bellows body, and an externally threaded cylindrical fixing member having an upper flange and being provided with an air tube at its bottom, said fixing member being inserted in the air outlet of the bellows body and screwed in an internally threaded bore provided in the bottom of the lid body so as to place an internal edge of the bottom of the bellows body forming the air outlet between the upper flange of the fixing member and the bottom of the lid body, thereby incorporating the bellows pump as an integral part of the lid body, the return spring being placed between said bellows cap and fixing member.

In the preferred embodiment of the present invention, the air tube molded or incorporated as an integral part of the fixing member is provided with one or more through-holes, or one or more slit-like air vents. The provision of the through-hole or slit-like air vent enables to prevent outflow of the liquid in the inner bottle which may occur when the level of the contained liquid is higher than the lower end of the air tube.

In another preferred embodiment, an insulating plug is rotatably fitted to the air tube of the fixing member to close the mouth of the inner bottle when lid body is screwed in place.

These and other objects, features and advantages of the present invention will be further apparant from the following description taken in conjunction with the figures of the accompanying drawings which show, by way of example only, vacuum bottles embodying the present invention.

DETAILED DESCRIPTION OF THE INVENTION

Figure 1:
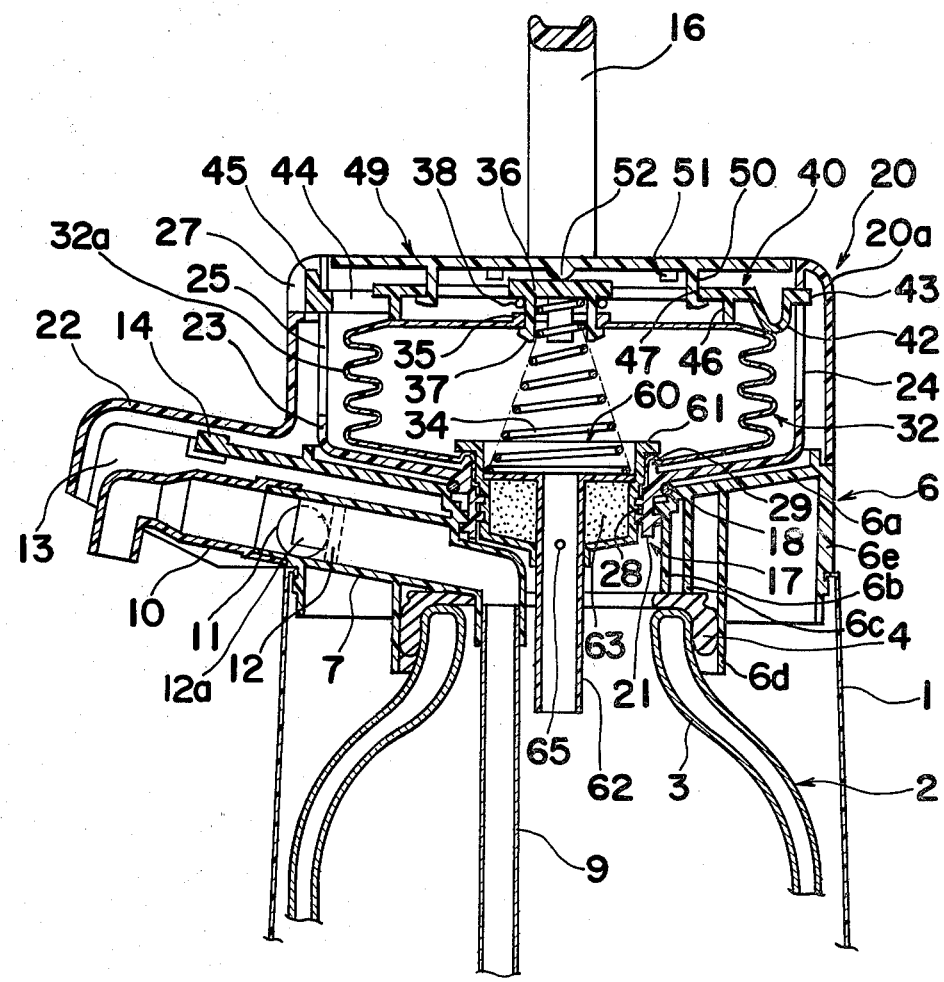
FIG. 1 is a sectional view of an upper half of a vacuum bottle embodying the present invention.

Referring to FIGS. 1 to 4, there is shown a vacuum bottle with a manually operated bellows pump according to the present invention. The vacuum bottle comprises an upper part including a bellows pump 32, and a lower part including an inner bottle 2. The upper part is removably mounted on the lower part.

The lower part of the vacuum bottle comprises the inner bottle 2 of a conventional double glass wall construction evacuated and silvered for insulation of cold and heat, and an outer container which comprises a cylindrical body 1 and a shoulder body 6 fixedly secured to the upper end of the body 1. The body 1, which may be made of steel for example, is fitted with a bottom assembly hereinafter described. The shoulder body 6 is provided with cylindrical holding portions 6b, 6c, 6d formed concentrically and extending downwardly from its collar portion 6a, and the innermost holding portion 6b extending from an opening 17 of the collar portion 6a is provided with an internal thread. The inner bottle 2 is arranged in a space formed between the body 1 with the bottom member and the shoulder body 6. The inner bottle 2 is mounted on the bottom member and its neck portion 3 of a reduced diameter is inserted in the holding portion 6d and held in place by the holding portions 6b, 6c and 6d. Disposed between the neck portion 3 and the holding portions 6b, 6c and 6d of the shoulder body is a resilient annular packing 4. The shoulder body 6 is provided, as an integral part therof, with a radially-extending liquid supply line 7 which is connected at its inner end to a pumping tube 9, and at the outer end to a bent, pouring tube 10. The pumping tube 9 extends downwardly and terminates at the level adjacent to the bottom of the inner bottle 2.

The pouring tube 10 is tapered at a portion near the corner to provide a seat for a ball 11 housed in the supply line 7. This ball 11 constitutes a stop valve together with the pouring tube 10 and closes the pouring tube 10 when the vacuum bottle is inclined in the left direction in FIG. 1. In the normal position, the ball 11 is received in one of the compartments provided in the supply line 7 which is comparted at its one end into two compartments by a divider 12a. One of the compartments receiving the ball 11 is shut off from the pumping tube 9 by a supporting plate 12, the other compartment being communicated with the pumping tube 9. The liquid pumped up through the pumping tube 9 flows through the other compartment. It is not necessarily required to provide the above stop valve mechanism.

Figure 2:
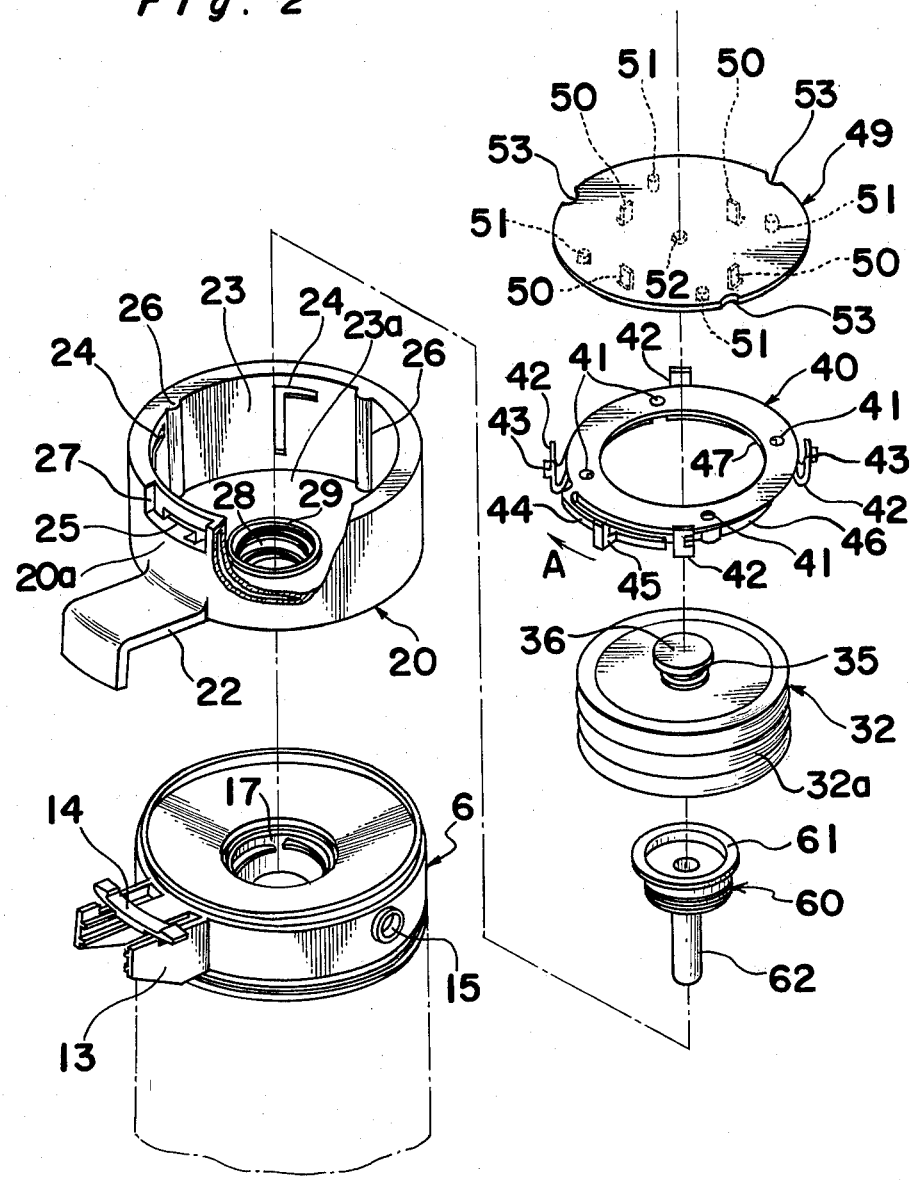
FIG. 2 is an exploded view of the upper half of the vacuum bottle of FIG. 1.
Figure 6:
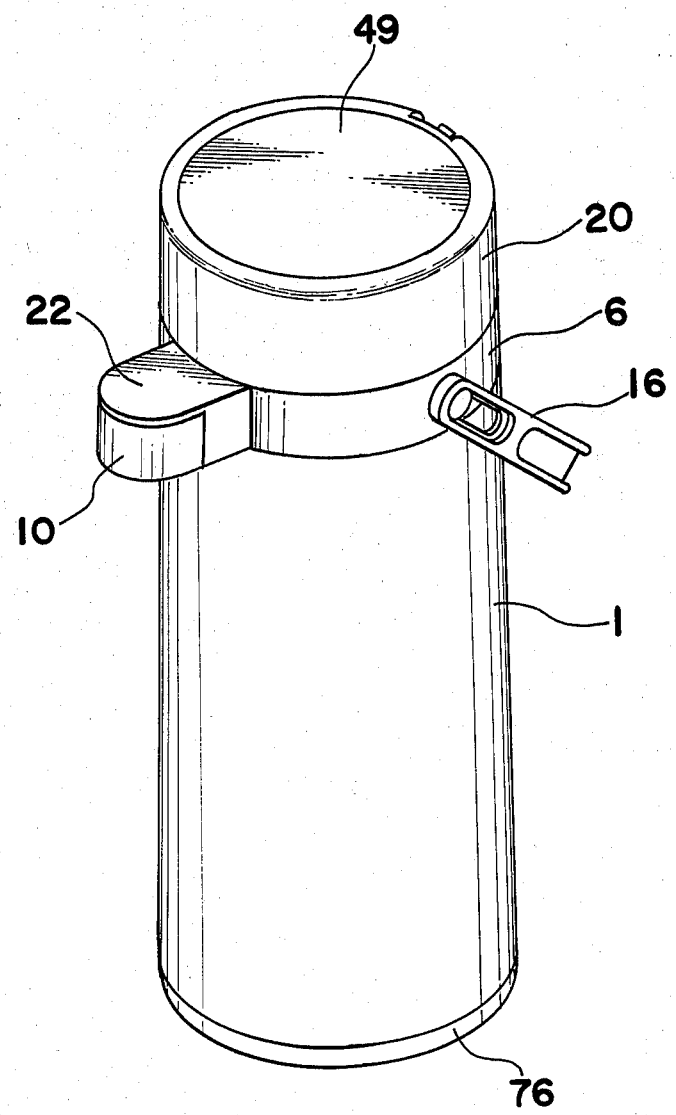
FIG. 6 is a perspective view of another embodiment of the vacuum bottle according to the present invention.
Figure 7:
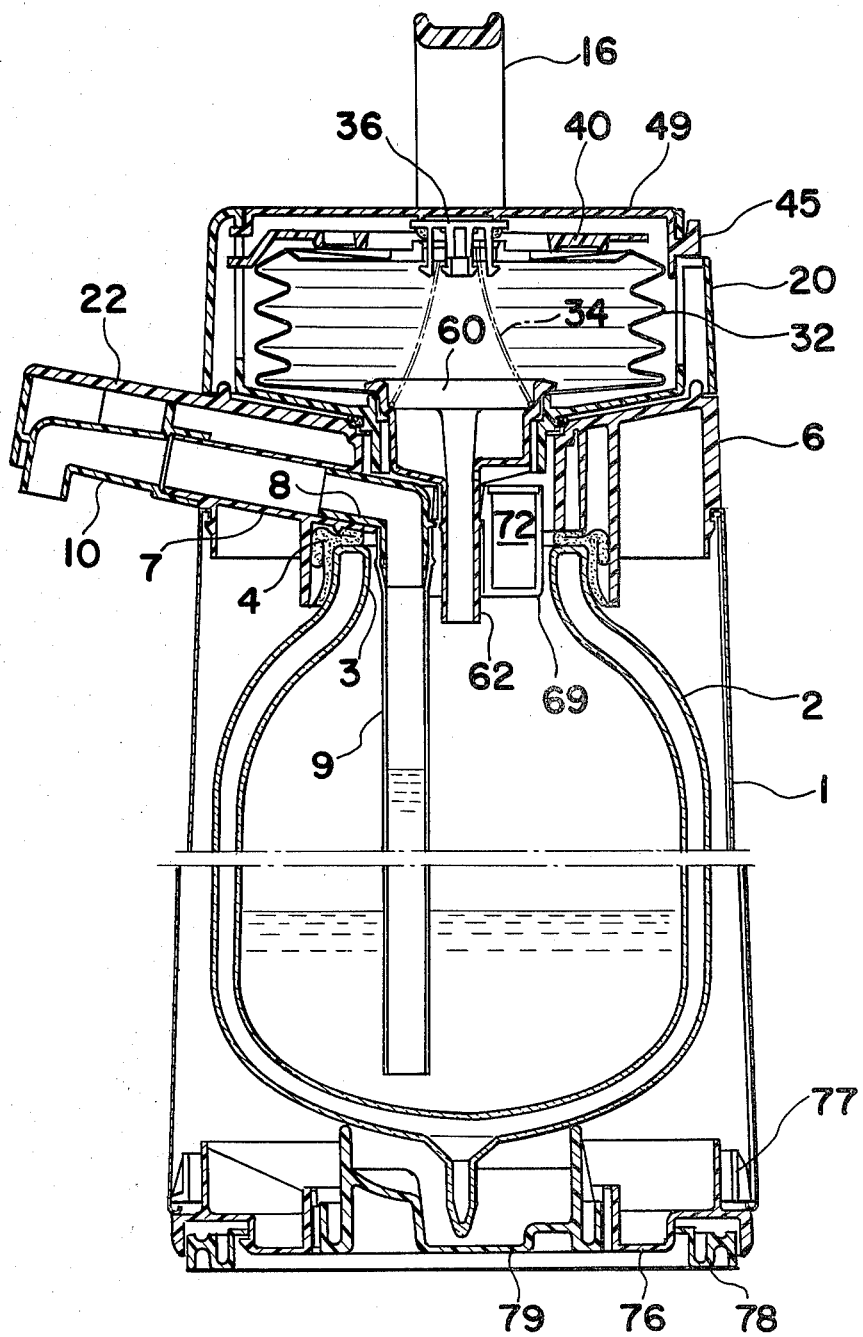
FIG. 7 is a sectional view of the vacuum bottle of FIG. 6.
Figure 8:
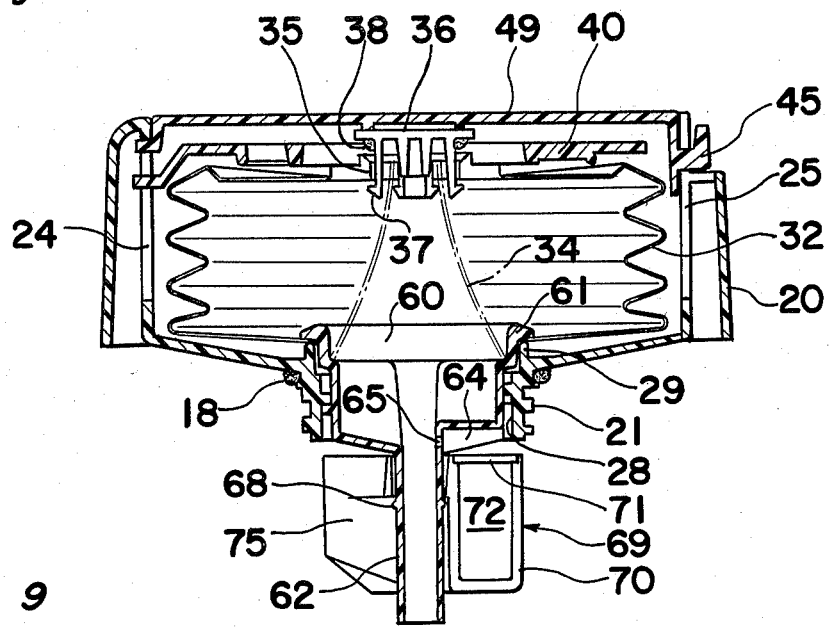
FIG. 8 is a sectional view of an upper part assembly of the vacuum bottle of FIG. 6 illustrating a condition removed from a lower part assembly.
Figure 9:
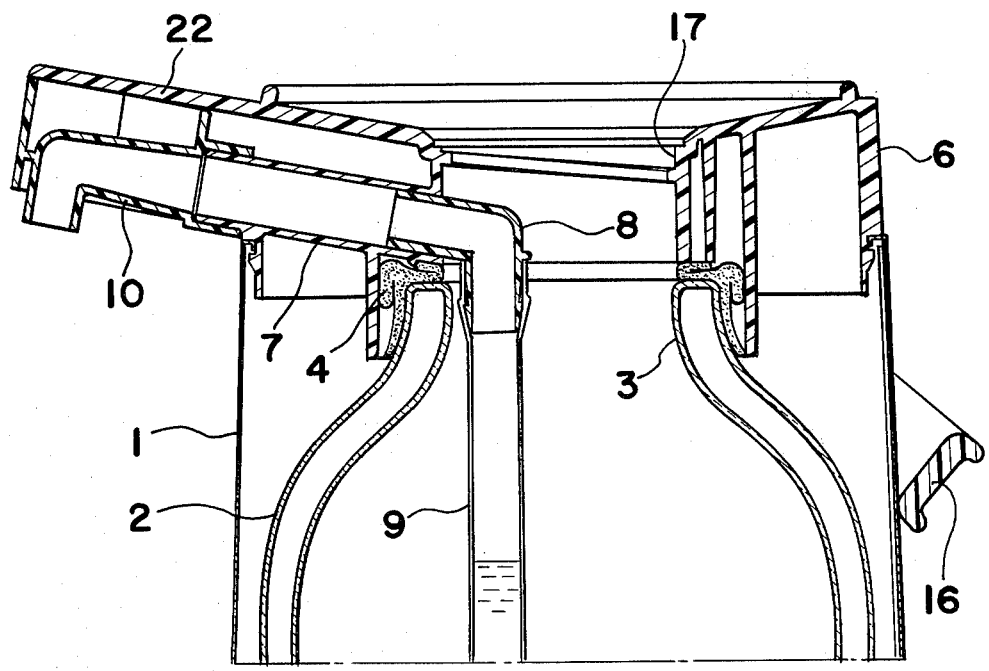
FIG. 9 is a section view of the lower part assembly of FIG. 6.
Figure 10:
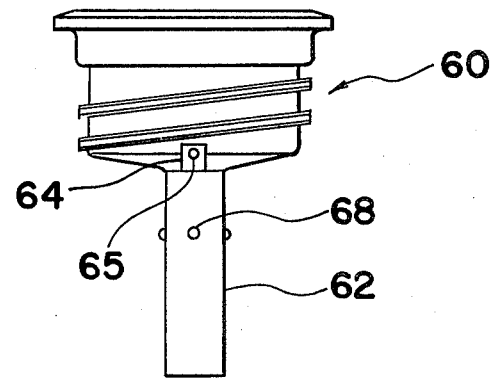
FIG. 10 is a front view of the fixing member in FIG. 6.

At the front of the shoulder body 6, a pair of protective side walls 13 for the pouring tube 10 and a T-shaped click 14 are formed as integral parts of the shoulder body 6. As shown in FIG. 2, two holes 15 are provided in pairs in the opposite sides of the shoulder body 6 for the attachment of a handle 16 (cf. FIGS. 1 and 2). This handle 16 is pivotally mounted on the shoulder 6 as shown in FIG. 6.

The upper part of the vacuum bottle comprises a lid body 20, and a bellows pump 32 incorporated as an integral part thereof. The lid body 20 has a cylindrical double wall construction integrally molded with a suitable synthetic resin. An inner wall 23 is provided with a centrally bored bottom 23a having a downwardly-extended cylindrical wall 21 and an upwardly projected annular rib 29 which are formed around the bore of the bottom as integral parts of the lid body 20. The cylindrical wall 21 is provided with an internal thread for the attachment of the bellows, pump and an external thread for the engagement with the internal threaded bore 17 of the shoulder body 6. When the external threaded portion 21 is screwed in the internal threaded bore 17 of the shoulder body 6, an L-shaped cover 22 is engaged with a click 14 and the lid body is fixed on the shoulder body as shown in FIG. 1. Disposed between the lid body and the shoulder body is a sealing ring 18. The inner wall 23 of the lid body is provided with four inversed L-shaped guide hole 24, one slide hole 25, and three half-round ribs 26. The slide hole 25 is communicated with a recess 27 provided in the outer wall 20a at its horizontal portion.

The bellows pump 32 comprises a bellows body 32a, integrally molded with an upper plate and a bottom a cap 36 recessed in the air inlet 35, a cylindrical fixing member 60 and a conical spring 34 placed between the cap 36 and fixing member 60. The bottom of the bellows body 32a is provided with a turn 33 (cf. FIG. 3) which forms the air outlet of the bellows body and is placed between the rib 29 of the bottom 23a of the lid body 20 and the upper flange 61 of the fixing member 60 screwed in the internal threaded bore 28 of the lid body. The fixing member 60 is provided with an air tube 62 having a flange at its top end, through which the interior of the bellows body 32a and the interior of the inner bottle 2 is communicated. A space formed between the fixing member 60 and the flanged air tube 62 is filled with a heat insulation 63. Thus, when hot water is contained in the inner bottle 2, the heat insulation 63 inhibits the heat dissipation from the fixing member 60. This contributes to the improvement in the heat-retaining efficiency of the vacuum bottle.

Figure 4:
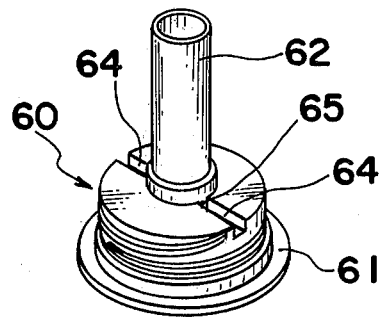
FIG. 4 is an inverted perspective view of a fixing member of a bellows pump.

As shown in FIG. 4, the fixing member 60 is provided at its lower side of its bottom with grooves 64 extending radially, and the air tube 62 is provided at the side of the fixed with a through-hole 65 communicating the interior and the exterior of the air tube 62. After inserting the conical spring 34 into the bellows body, the flanges 61 of the fixing member 60 is forcedly inserted into the air outlet of the bellows body 32a, and then the member 60 is engaged with the internal threaded bore 28 of the lid body 20 at its external threaded portion.

The cap 36 is forcedly inserted into the air inlet 35 and caught therein at its hooks 37. The cap is movably arranged in the air inlet 35. The conical spring 34 is placed between the cap 36 and the fixing member 60 so that the cap 36 is forced upwardly together with the upper portion of the bellows body 32a, and the bellows body 32a is kept in the expanded state. Numeral 38 shows a seal ring disposed around the hook portion of the cap 36 and used for sealing of the cap 36 and the bellows body 32a.

As shown in FIG. 2, a ring-shaped lock plate 40 is provided at its circumference with four U-shaped leg 42 and an arm 44 curved in the form of a circular arc. A rib 43 provided on the outer surface of the leg 42 is slidably put in the guide groove 24 of the lid body 20. A knob 45 provided on the arm 44 is put in the slide hole 25 and, when the lock plate 40 is positioned at the top end, projected into the recess 27 through the groove 25. An annular rib 46 provided on the lower end of the lock plate 40 is in contact with the upper surface of the bellows pump 32.

An operating disc 49 is mounted on the lock plate 40 by inserting four downwardly extending hooks 50 into the central hole of the lock plate 40. Four projections 51 extending downwardly from the lower surface of the operating disc 49 are situated to the position corresponding to that of the hole 41 of the lock plate 40 when the lock plate 40 is unlocked, and are inserted into the holes 41 when pushing down the operating disc 49 to prevent the relative rotational motion between the lock plate 40 and the operating plate 49. A hemisphere projection 52 provided on the center of the lower surface of the operating disc 49 is in contact with the top of the bellows cap 36. The operating disc 49 may move up and down along the guide ribs 26 provided in the inner wall of the lid body 20, as the semicircular recess 53 is fit with the guide ribs 26.

The thus constructed vacuum bottle is operated in the following manner.

In the normal condition, the operating disc 49 is forced upward together with the lock plate 40 by means of the conical spring 34 arranged in the bellows body 32a, and its upper surface is reached to the level with the top end of the lid body 20, as shown in FIG. 1. The hooks 50 of the operating disc 49 are engaged with the inner edge of the lock plate 40 which is in turn engaged at the guide pins 43 of its leg portions 42 with the top ends of the guide grooves 24. Thus, the operating disc 49 and the lock plate 40 are prevented from further upward movement. The interior of the inner bottle 2 is communicated with the atmosphere through the air tube 62 and the air inlet 35 of the bellows body 32a, so that the vapour in the inner bottle may escape therefrom.

When pouring the liquid, for example hot water, in the inner bottle 2, the operating disc 49 is pushed downward. By this operation, the cap 36 in firstly forced down, and the seal ring 38 comes into contact with the upper surface of the bellows body 32a to block the air inlet 35. At the same time, the operating disc 49 comes into contact with the upper surface of the lock plate 40. After this, the lock plate 40 is forced downward together with the operating disc 49, by which the bellows body 32 is compressed to feed air into the interior of the inner bottle 2 through the air tube 62 passing through the fixing member 60. The air fed from the bellows pump increases the internal pressure in the inner bottle 2 so that the hot water in the inner bottle 2 is pumped up through the pumping tube 9 and poured from the pouring tube 10 through the supply line 7 of the shoulder body 6.

When the operating disc 49 is released from the external force, the cap 36 and the operating disc 49 are forced upward by the spring 34 to open the air inlet 35, and then restored to the normal state together with the lock plate 40 and the bellows body 32.

If a larger amount of the liquid is to be poured, the above operation is repeated.

In order to prevent the outflow of the liquid due to the careless operation of the operating disc 49, the knob 45 of the lock plate 40 is turned in the direction of an arrow A in FIG. 2 until it stops. In this case, the guide pins 43 of the lock plate 40 move along the horizontal portion of the guide groove 34. While the lock plate 40 turns, the operating plate 49 and bellows body 32a remain in the normal condition. Under this condition, the lock plate 40 does not move downward even when the operating disc 49 is applied an external force since the guide pins 43 of the lock plate 40 are locked in the horizontal portions of the guide grooves 24. Thus, the bellows body 32a is not compressed and the outflow of the liquid is prevented. When releasing the lock of the guide pins 43, the knob 45 of the lock plate 40 is turned in the reverse direction of the arrow A in FIG. 2 until it stops. In this condition, the knob 45 and the guide pins 43 are placed in the top ends of the vertical portions of the guide grooves 24.

Figure 3:
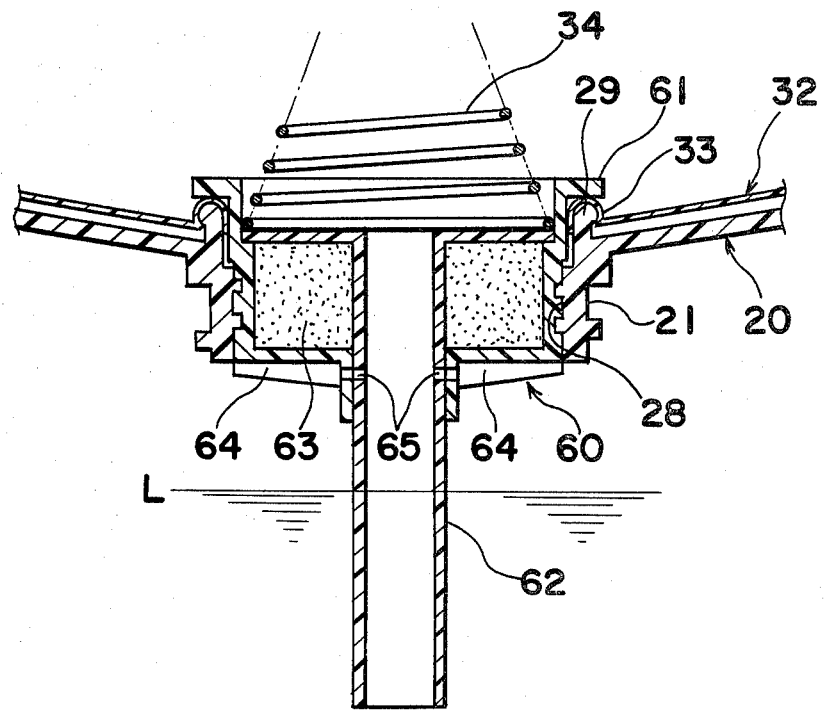
FIG. 3 is an enlarged sectional view of the essential part of the vacuum bottle of FIG. 1.
Figure 5:
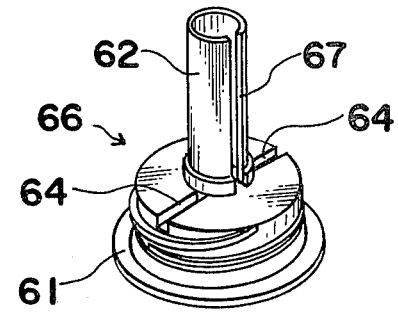
FIG. 5 is an inverted perspective view of another form of the fixing member.

In the normal and locked conditions, when hot water is contained in the inner bottle 2 at a level L shown in FIG. 3, the lower part of the air tube 62 is submerged in the hot water. If, therefore, there is no passage for the vapour in the inner container, the hot water would be poured through the pouring tube 10 under the influence of the increased vapour pressure. According to the present invention, this problem is solved by the provision of a through-hole 65 through which the space formed between the mouth of the inner bottle 2 and the fixing member 60 communicates with the interior of the bellows body 32a which in turn communicates with the atmosphere through the air inlet 35. The vapour in the inner bottle 2 escapes from the inner bottle 2 through the through-hole 65 and the bellows body 32a, so that the pouring of the liquid due to the vapour is prevented. Instead of the provision of the through-hole 65, a slit-like air vent 67 may be provided in the air tube 62 shown in FIG. 5. The air vent 67 extends from the free end of the air tube 62 to the fixed end thereof.

In the above embodiment, the passage for the vapour is formed by the provision of the through-hole or slit in the air tube, but any modification may be possible. For example, an air vent may be provided in the fixing member separately from the air tube.

Referring now to FIGS. 6 to 13, there is shown another embodiment of the vacuum bottle according to the present invention. Since this embodiment has various features in common with the embodiment of FIGS. 1 to 4, like parts are numbered with like reference numerals on all the figures.

Figure 11:
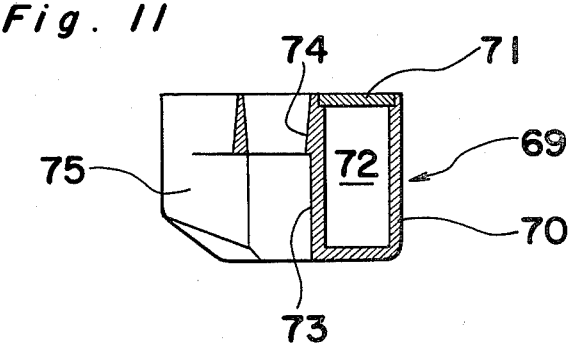
FIG. 11 is a sectional view of an insulating plug in FIG. 6.
Figure 12:
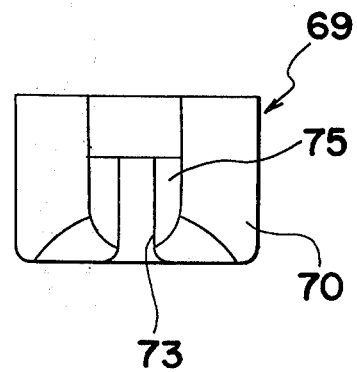
FIG. 12 is a left view of the insulating plug of FIG. 11.
Figure 13:
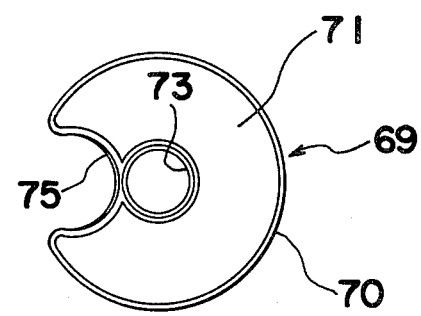
FIG. 13 is a plane view of the insulating plug shown in FIG. 11.

The essential feature of this embodiment is that a plug 69 is rotatably mounted on the air tube 62 which serves to decrease the opening area of the mouth of the inner bottle 2. As illustrated in FIGS. 11 to 13, the plug 69 comprises a closed-end plug body 70 and a cover 71 fixed on the upper portion of the plug body 70 to form an insulating chamber 72 in the plug 69. When the upper part of the vacuum bottle 2 is mounted on the lower part thereof, the plug 69 loosely inserted in the mouth of the inner bottle 2, and the opening area of the mouth of the inner bottle is decreased. Thus, the plug 69 contributes to decrease heat dissipation from the mouth of the inner bottle and improves the heat-retaining efficiency. The chamber 72 of the plug 69 may be filled with a suitable heat-insulating material. The plug 69 has a tapered central bore 74 into which the air tube 62 is forcedly inserted until several projections 68 provided on the air tube 62 is passed through the central bore 74. The separation of the plug 69 from the air tube is prevented by the projections 68. Any additional stopper may be provided on the lower end of the air tube 62. The plug 69 is provided with a recess 75 having a semi-circular cross section and running parallel with the air tube 62. This recess 75 is engaged with the connecting tube 8 through which the pumping tube 9 communicates with the supply line 7 of the shoulder body 6.

In the above embodiment, the pouring tube cover 22 is molded as an integral part of the shoulder body 6. The knob 45 is molded as an integral part of the operating disc 49, so that the lock plate 40 merely serves to regulate the upward movement of the upper surface of the bellows body 32a. The fixing member 60 is integrally molded with the air tube 62 and contains no heat-insulating material therein.

The vacuum bottles of the above embodiments are respectively provided with a bottom assembly as well as the conventional ones. As can be seen from FIG. 7, the bottom assembly comprises a bottom body 76, a rotating bottom 78 rotatably arranged in the groove of the bottom body 76, and a clamping body 79 engaged with an internal threaded central bore of the bottom body 76. The bottom body 76 is engaged with an internal threaded ring 77 fixed to the lower end of the body 1. The inner bottle 2 is held between the packing 4 and the flexible cylindrical supporting portion of the clamping body 79 by screwing the clamping body 79 into the central bore of the bottom body 76. When the vacuum bottle is put on the table, it may be turned clockwise or counterclockwise.

As will be understood from the above, according to the present invention there is no need to fuse the separately prepared lower plate to the lower end of the bellows body because of the construction that the bellows pump is incorporated as an integral part of the lid body by screwing the fixing member into the lid body so as to place the internal edge of the bellows body between the fixing member and the lid body. Also, there is no fear of air leakage between the bellows pump and the lid body since the internal edge of the bellows body placed between the fixing member and the lid body acts as the packing between them. Since the fixing member may be made of a hard plastic material such as polypropylene, there is no fear of lowering of the airtightness between the bellows pump and the lid body, which may occur by the poor creep characteristics and the softening of the used material. The return spring can be inserted through the air outlet, so that it is easy to assemble the same in the bellows pump. Since the bellows body is screwed on and can be removed, it it possible to replace the bellows body with the new one with ease when the lifetime of the bellows body becomes exhausted.

What I claim is:

1. A vacuum bottle with a bellows pump comprising an inner bottle of a vacuum-insulated double wall construction, an outer container comprising a cylindrical body provided with a bottom, a shoulder body mounted on the top of the cylindrical body and provided with a liquid supply line to which a downwardly extending pumping tube and a pouring tube are connected, and a lid body removably mounted on the shoulder body, and a bellows pump arranged in the lid body and adapted to feed air into the interior of the inner bottle to increase the internal pressure therein, thereby pouring the liquid in the inner bottle therefrom through the pumping tube and pouring tube, said inner bottle being arranged in a space formed between said body and the shoulder body, said bellows pump comprising a bellows body integrally molded with a bottom having an air outlet, a return spring arranged in the bellows body, a bellows cap movably mounted in an air inlet formed at the central portion of an upper plate of the bellows body, and an externally threaded cylindrical fixing member having an upper flange and being provided with an air tube at its bottom, said fixing member being inserted in the air outlet of the bellows body and screwed in an internally threaded bore provided in the bottom of the lid body so as to place an internal edge of the bottom of the bellows body forming the air outlet between the upper flange of the fixing member and the bottom of the lid body, thereby incorporating the bellows pump as an integral part of the lid body, the return spring being placed between said bellows cap and the fixing member.

2. The vacuum bottle according to claim 1 wherein said air tube is provided with one or more through-hole at its fixed end.

3. The vacuum bottle according to claim 1 wherein said air tube is provided with one or more slit-like air vents extending from its fixed end to the free end.

4. The vacuum bottle according to claim 1 wherein an insulating plug is rotatably fitted to the air tube to close the mouth of the inner bottle when the lid body is screwed in place.

* * * * *